Nov. 3, 1953      E. BERG      2,657,559
ANTIDRIP DEVICE FOR COFFEE CUPS AND THE LIKE
Filed Aug. 31, 1951
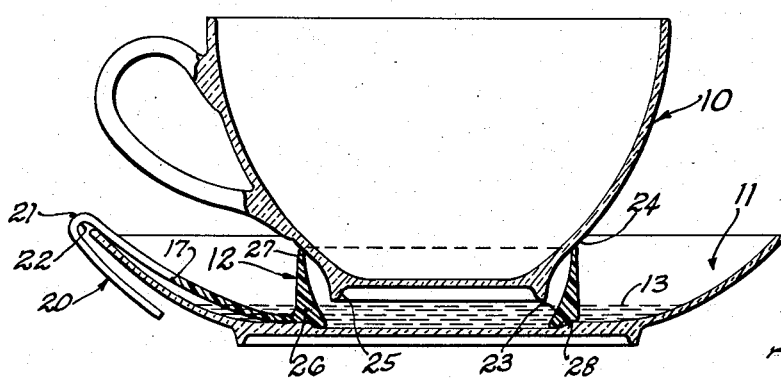
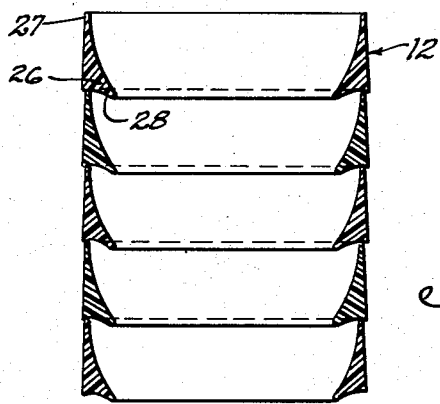
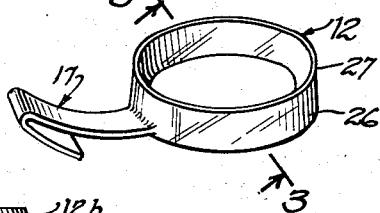
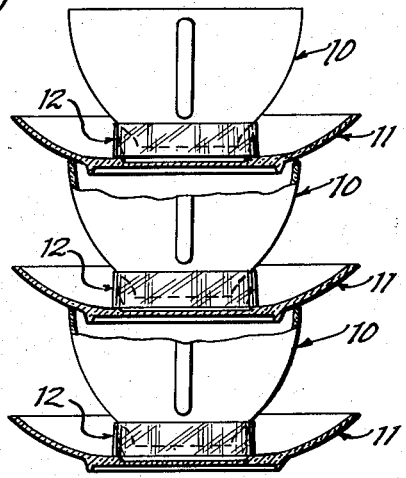
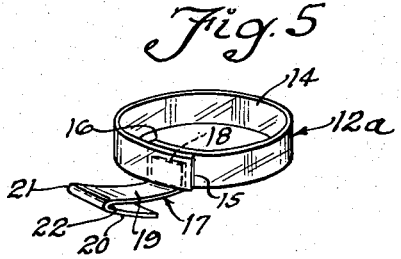
INVENTOR.
Elaine Berg
BY Robert H. Wendt
Att'y Patented Nov. 3, 1953

2,657,559

UNITED STATES PATENT OFFICE 2,657,559

ANTIDRIP DEVICE FOR COFFEE CUPS AND THE LIKE

Elaine Berg, Chicago, Ill., assignor of one-third to Robert H. Wendt, Evanston, and one-third to Faith P. Peters, Chicago, Ill.

Application August 31, 1951, Serial No. 244,665

1 Claim. (Cl. 65—65)

The present invention relates to anti-drip devices for coffee cups and the like, and is particularly concerned with the provision of an improved device for supporting a cup in a saucer in such manner that spillage or drip is drained away from the cup, and the cup is maintained in a dry condition.

One of the objects of the invention is the provision of an improved anti-drip device for cups and the like which supports the cup in spaced relation to the bottom of the saucer in a firm and stable manner so that the drip may run down into the saucer; and the cup may be kept out of contact with any spillage or drip.

Another object of the invention is the provision of a device of the class described which is so constructed that they may be stacked and so that cups and saucers full of coffee or the like may be stacked and carried with the anti-drip devices in the assembly.

Another object of the invention is the provision of an improved device of the class described which is simple, capable of economical manufacture, attractive in appearance, and which does not detract in any way from the appearance of the cup and saucer assembly, appearing to be practically invisible.

Other objects and advantages of the invention will be apparent from the following description and the accompanying drawings, in which similar characters of reference indicate similar parts throughout the several views.

Referring to the single sheet of drawings accompanying the specification,

Fig. 1 is a sectional view, taken on a plane passing through the axis of the coffee cup and saucer, equipped with an anti-drip device embodying the invention;

Fig. 2 is a view in perspective of the anti-drip device;

Fig. 3 is an axial sectional view, taken through a stack of the anti-drip devices, taken on the plane of the line 3—3 of Fig. 2;

Fig. 4 is a view in partial section of a part of a stack of cups and saucers equipped with the present device;

Fig. 5 is a view in perspective of a simpler form of device made out of sheet material;

Fig. 6 is a sectional view of a saucer equipped with an integral anti-drip device;

Fig. 7 is an elevational view showing a part of a stack of anti-drip devices of a still more simple construction.

Referring to Fig. 1, this view shows in cross section a coffee cup 10, a saucer 11 equipped with an anti-drip device 12 embodying the invention and holding the cup in spaced relation from the drip and spillage 13.

The present anti-drip device may be molded out of transparent plastic material; and one of the preferred forms of the device is shown in Fig. 5. This anti-drip device 12a consists of a simple ring 14 of transparent plastic material, such as thin sheet "Lucite" or "Plexiglass," either of which is flexible enough to be bent to cylindrical or conical form, and which is stiff enough to maintain that shape.

The ring 14 is made of a strip of sheet material, having its ends 15 and 16 integrally welded together by softening the adjacent surfaces of the plastic with a plastic solvent. A handle or locating member 17 is preferably attached at the same place as the joint between the ends 15 and 16.

This handle has an upwardly turned attaching flange 18 similarly welded to the ring, and has a curved shank 19, which may correspond substantially to the curvature of the side of the saucer. At its end the curved shank carries a backwardly turned hook 20, being folded back upon itself at 21; and the hook has an easy bend on the inside at 22 so that it fits over the edge of the saucer.

The length of the shank 19 is such that the hook is located over the edge of the saucer when the ring is centrally located in the saucer. The size of the ring is preferably larger than the diameter of the usual depression 23 in the bottom of the saucer; and the ring is also preferably large enough to engage the round portion of the cup 24, which is partially spherical, and which is located above the lower supporting rim 25 of the cup.

Making the ring larger than the supporting rim 25 of the cup gives the cup greater stability in the ring. When the anti-drip device is made of transparent sheet material, it is practically invisible; and the color of the cup and saucer assembly predominates so that the present device does not detract at all from the appearance of a set of dishes. The cup merely appears to be suspended in midair above the drip or the transparent collar.

Referring now to Fig. 1, this is a modification in which the anti-drip device is molded and provided with the same shank and hook; but the ring 12 has been made thicker toward the bottom portion 26 and thinner toward its top edge 27. The inside and the outside of the ring may be tapered toward the edge 27 for ease in removing molds; and the bottom of the ring, 28, may be shaped to conform to the depression 23 in the saucer, which it fits, tending to prevent the ring from sliding around in the saucer.

Referring to Fig. 7, this is an elevational view, showing another modification, in which the rings 12b comprise simple frusto-conical annular members. These are preferably transparent and may be molded or made of sheet material, and differ from Fig. 5, in which the annular member is cylindrical, by being frusto-conical, which lends itself readily to molding because the outside mold can be pulled off the top; and the inside mold can be pulled off the bottom of each ring.

The rings, being frusto-conical, can be stacked one inside the other; and although they lack the handle 17, they still support the cup in spaced relation to the saucer, and are held in place by the weight of the cup.

The devices of Fig. 5, when frusto-conical, can also be stacked in the same way, the handles resting one upon the other.

Referring to Fig. 3, this shows a stack of the molded anti-drip devices of Fig. 1.

Referring to Fig. 4, this shows a stack of cups and saucers equipped with any one of the anti-drip devices of the invention.

Referring to Fig. 6, this shows a saucer 11c provided with an integral anti-drip ring 12c, which is molded integrally with the saucer. Such a saucer may be most economically made out of a moldable plastic; and the integral ring 12c is preferably frusto-conical on its outside and inside; the molds which form it may be withdrawn.

The ring 12c preferably has one or more slots 28 running down to the bottom of the saucer to permit drippage and spillage to run inside the ring from the outside or vice versa.

It will thus be observed that I have invented a plurality of forms of anti-drip devices for cups and saucers, any one of which is adapted to hold the cup in spaced relation to the bottom of the saucer, out of contact with drippage and spillage. Thus the bottom of the cup is substantially dry; and the drip does not fall upon the tablecloth or clothing of the user.

The present devices, when made of frusto-conical form, can be nested inside each other and stacked; and being transparent, they are practically invisible when disposed between the cup and saucer. For example, a blue cup and saucer is visible through the ring; and the ring merely supports the cup without detracting from the color or appearance of the assembly.

The handle also serves the useful purpose of permitting the waitress to handle the saucer with her thumb above the handle and forefinger below it, without physically touching the saucer. The saucer may be maintained in a sanitary condition so that the spillage is also sanitary and may be poured back in the cup.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

An anti-drip device for coffee cups and saucers, comprising an annular member formed of a strip of relatively stiff, bendable material of sufficient width to space a cup from a saucer, with the cup out of contact with the bottom of the saucer, said band having its ends overlapping and secured together, the diameter of said annular member being sufficient to receive and support a cup on the upper edge of said annular member, with the cup depending into the annular member, and a radially extending handle having an upwardly turned attaching flange secured at said overlapping parts of said band, said handle curving upwardly in substantial conformity to the curvature of the inside of a saucer, and being bent backwardly upon itself at an acute angle, to extend below the outer portion of the saucer and to provide a handle covering sufficient of the saucer, so that the saucer may be grasped between the thumb and forefinger at said handle without the fingers engaging the saucer, and the length of said handle being such that when the handle is hooked over the edge of a saucer, said annular member is disposed substantially centrally of said saucer.

ELAINE BERG.

References Cited in the file of this patent

UNITED STATES PATENTS

| Number | Name | Date |
| --- | --- | --- |
| Re. 13,825 | Blackwell | Nov. 17, 1914 |
| 503,508 | Walter | Aug. 15, 1893 |
| 1,160,924 | Mangisch et al. | Nov. 16, 1915 |
| 1,225,870 | Schwing | May 15, 1917 |
| 1,229,226 | Cary | June 12, 1917 |
| 1,657,664 | Dexter | Jan. 31, 1928 |
| 1,999,796 | Zinser | Apr. 30, 1935 |
| 2,042,801 | Pittman | June 2, 1936 |
| 2,059,769 | Bell | Nov. 3, 1936 |
| 2,117,102 | Pittler | May 10, 1938 |
| 2,117,266 | Adams | May 17, 1938 |
| 2,224,421 | Aaron | Dec. 10, 1940 |
| 2,427,697 | Weidler | Sept. 23, 1947 |
| 2,518,368 | Peters | Aug. 8, 1950 |

FOREIGN PATENTS

| Number | Country | Date |
| --- | --- | --- |
| 20,625 | Great Britain | Sept. 18, 1911 |
| 527,078 | France | July 18, 1921 |